United States Patent [19]
Kimura et al.

[11] Patent Number: 5,383,057
[45] Date of Patent: Jan. 17, 1995

[54] REARVIEW MIRROR ASSEMBLY FOR MOTOR VEHICLES

[75] Inventors: Sakae Kimura; Michio Hamada, both of Saitama, Japan

[73] Assignee: Kabushiki Kaisha Matsuyama Seisakusho

[21] Appl. No.: 893,881

[22] Filed: Jun. 4, 1992

Related U.S. Application Data

[63] Continuation of Ser. No. 599,483, Oct. 18, 1990, abandoned.

[30] Foreign Application Priority Data

Oct. 19, 1989 [JP] Japan ............... 1-122563[U]

[51] Int. Cl.$^6$ .................... G02B 7/18; B60R 1/06
[52] U.S. Cl. ..................... 359/841; 359/874; 359/875; 248/485
[58] Field of Search ........... 350/604, 606, 632, 634, 350/635; 248/479, 484, 485, 486, 487, 900; 359/841, 872, 873, 874, 875, 876

[56] References Cited

U.S. PATENT DOCUMENTS

| | | | |
|---|---|---|---|
| 4,279,473 | 7/1981 | Yamana | 350/635 |
| 4,660,944 | 4/1987 | Suzuki et al. | 350/635 |
| 4,783,161 | 11/1988 | Shamoto | 248/479 |
| 4,856,886 | 8/1989 | Polzer et al. | 350/635 |
| 4,988,068 | 1/1991 | Yamana et al. | 350/604 |
| 5,182,676 | 1/1993 | Iwai et al. | 359/875 |

FOREIGN PATENT DOCUMENTS

| | | | |
|---|---|---|---|
| 60-53443 | 3/1985 | Japan . | |
| 0122047 | 6/1986 | Japan | 350/635 |
| 0134346 | 6/1987 | Japan | 359/875 |
| 0221949 | 9/1987 | Japan | 350/604 |
| 0053141 | 3/1988 | Japan | 350/635 |
| 0111551 | 4/1989 | Japan | 350/606 |

*Primary Examiner*—Ricky D. Shafer
*Attorney, Agent, or Firm*—Howard L. Rose

[57] ABSTRACT

An automotive rearview mirror assembly includes a mirror housing adapted to be mounted on a fixed member of an automobile outside of the passenger's compartment, a mirror swingably disposed in the mirror housing, a control mechanism including a control lever adapted to project from the housing into the passenger's compartment, and a rotatable shaft mechanism pivotally coupled to a rear surface of the mirror at a plurality of positions thereon, the rotatable shaft mechanism being rotatable in response to control movements of the control lever, for vertically and laterally adjusting the angle of the mirror with respect to the mirror housing. The mirror housing is angularly movable about the axis of the rotatable shaft mechanism in unison with the mirror within the mirror housing.

13 Claims, 7 Drawing Sheets

REARVIEW MIRROR ASSEMBLY FOR MOTOR VEHICLES

This is a continuation of co-pending application Ser. No. 07/599,483, filed on Oct. 18, 1990, now abandoned.

BACKGROUND OF THE INVENTION

1. Field of the Invention

The present invention relates to a rearview mirror assembly for motor vehicles, and more particularly to an automotive rearview mirror assembly which is capable of adjusting the angle of a rearview mirror mounted on an automobile door.

2. Description of the Relevant Art

Some automotive rearview mirror assemblies, particularly those mounted on automobile doors, are combined with a mechanism for adjusting the angle of the rearview mirror through a manually operated lever which projects into the passenger's compartment of the automobile.

FIG. 10 of the accompanying drawings schematically shows one conventional automotive rearview mirror assembly. As shown in FIG. 10, a remote control lever 101 projecting into a passenger's compartment is swingably mounted on a fixed vehicle body member 100, and a mirror housing 102 in which a mirror 103 is supported is mounted on the vehicle body outside of the passenger's compartment. The mirror 103 is pivotally supported within the housing 102 by a pivot 104 which has a stop 104a to prevent the mirror 103 from rotating within the housing 102. The mirror 103 is operatively coupled to the remote control lever 101 through a link mechanism 105. The link mechanism 105 comprises a first link 106, a shaft 107, and a second link 108. The first link 106 is connected between the remote control lever 101 and the shaft 107, which is rotatably and vertically movably supported in a sleeve 109 fixed to the housing 102. The second link 108, which is connected at one end to the shaft 107, has a distal end pivotally joined to the back of the mirror 103 at a position which is located obliquely upwardly of the pivot 104.

When the remote control lever 101 is swung back and forth in the longitudinal direction of the automobile (i.e., in directions normal to the sheet of FIG. 10), the first link 106 is angularly moved in a horizontal plane, causing the shaft 107 to rotate about its own axis within the sleeve 109. The rotation of the shaft 107 then rocks the second link 108 back and forth in the longitudinal direction of the automobile. When the second link 108 thus swings, the mirror 103 is tilted laterally about the pivot 104 for lateral angular adjustment thereof.

When the remote control lever 101 is swung vertically in the direction indicated by the arrow A or B, the shaft 107 is vertically moved in the sleeve 109 by the first link 106. The vertical movement of the shaft 107 is transmitted through the second link 108 to the mirror 103, which is then tilted vertically about the pivot 104 for vertical angular adjustment thereof.

As described above, vertical angular adjustments of the mirror 103 are achieved when the shaft 107 is vertically moved. However, since an extra space is necessary to allow the shaft 107 to move vertically therein, the mechanism for adjusting the angle of the mirror has an increased height, and the entire rearview mirror assembly is large in size. Therefore, limitations are imposed on the designing of the rearview mirror assembly.

There is a certain gap or clearance between the shaft 107 and the sleeve 109. Because the shaft 107 is subject to small lateral forces from the first link 106 when the shaft 107 moves vertically, the shaft 107 tends to move vertically in the sleeve 109 while the shaft 107 is being tilted with respect to the sleeve 109. As a consequence, the shaft 107 is held in localized abutment against the sleeve 109, and hence is subject to increased resistance when the shaft 107 moves vertically in the sleeve 109, with the result that increased forces are required to move the remote control lever 101. Such localized engagement between the shaft 107 and the sleeve 109 brings about localized wear on the shaft 107 and the sleeve 109 over a long period of time.

Another problem is that foreign matter such as dust particles is liable to be trapped between the shaft 107 and the sleeve 109 when the shaft 107 vertically moved in the sleeve 109. The deposited foreign matter between the shaft 107 and the sleeve 109 also increases the forces required to move the remote control lever 101.

SUMMARY OF THE INVENTION

In view of the drawbacks of the conventional remotely controlled automotive rearview mirror assemblies, it is an object of the present invention to provide an automotive rearview mirror assembly which is relatively small in size and can be operated on with relatively small forces.

According to the present invention, there is provided an automotive rearview mirror assembly for use on an automobile having a passenger's compartment, comprising a mirror housing adapted to be mounted on a fixed member of the automobile outside of the passenger's compartment, a mirror swingably disposed in the mirror housing, a control mechanism including a control lever adapted to project from the housing into the passenger's compartment, and a rotatable shaft mechanism pivotally coupled to a rear surface of the mirror at a plurality of positions thereon, the rotatable shaft mechanism being rotatable in response to control movements of the control lever, for vertically and laterally adjusting the angle of the mirror with respect to the mirror housing.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
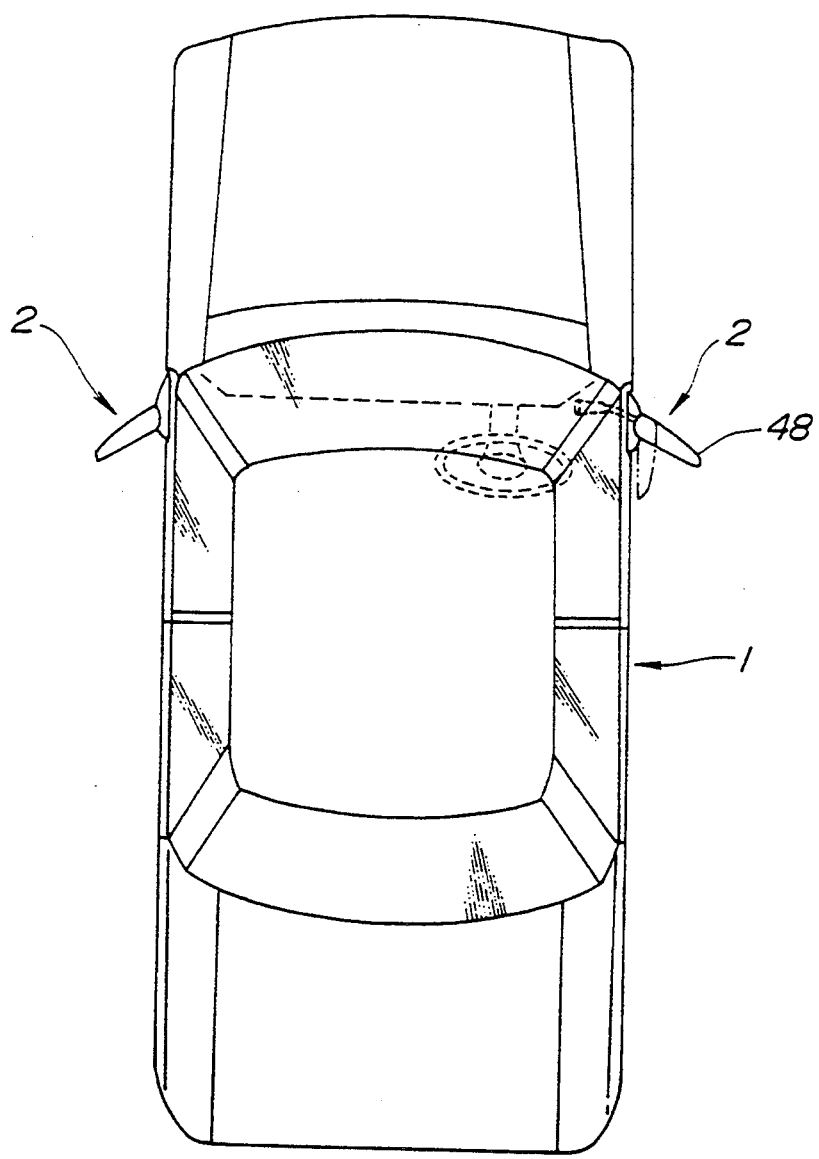
FIG. 1 is a plan view of an automobile which incorporates a rearview mirror assembly according to the present invention.

FIG. 1 shows an automobile 1 which has a pair of automotive rearview mirror assemblies 2 mounted on front portions of front doors, respectively.

Figure 2:
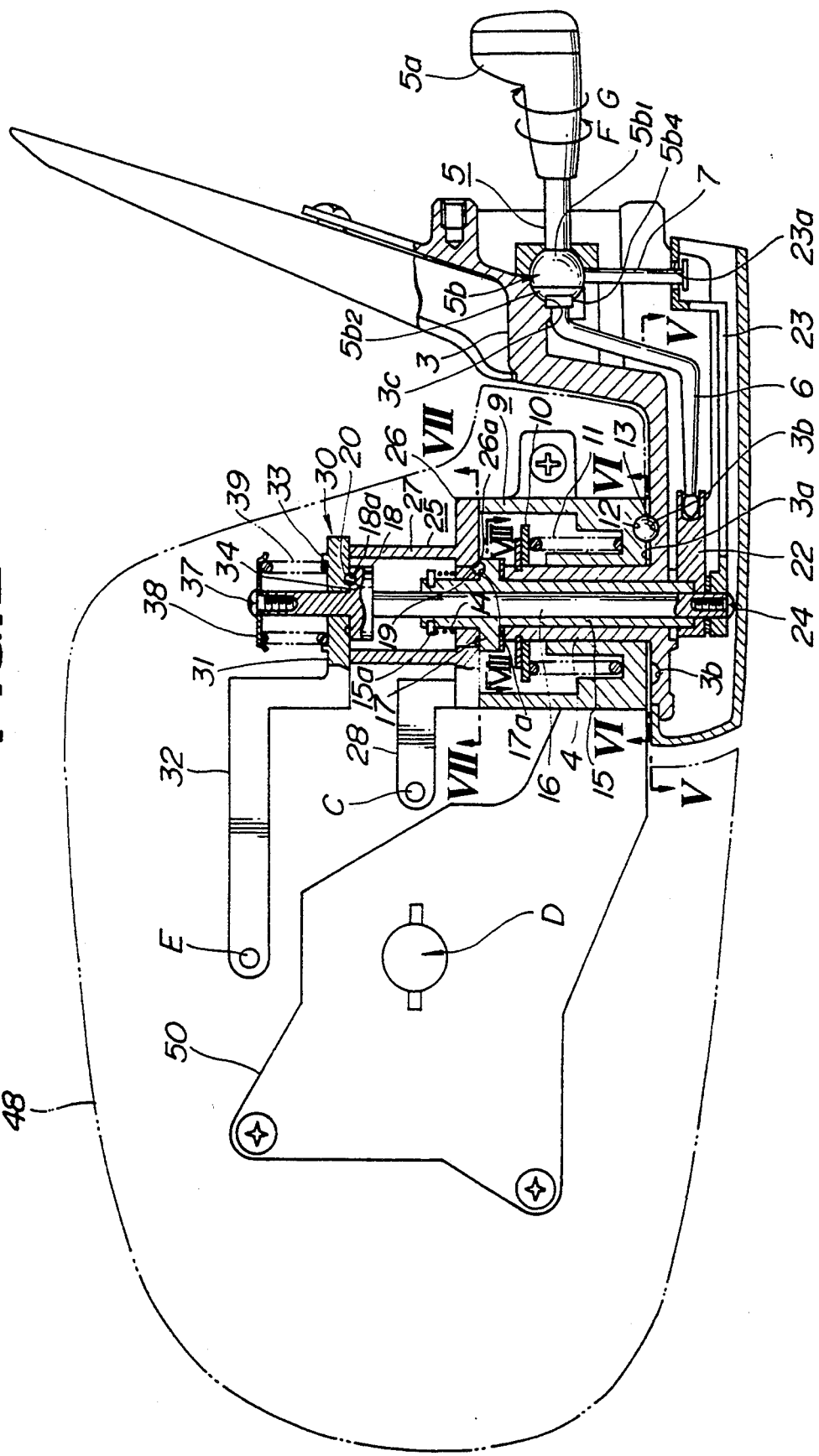
FIG. 2 is a vertical cross-sectional view of the rearview mirror assembly.
Figure 3:
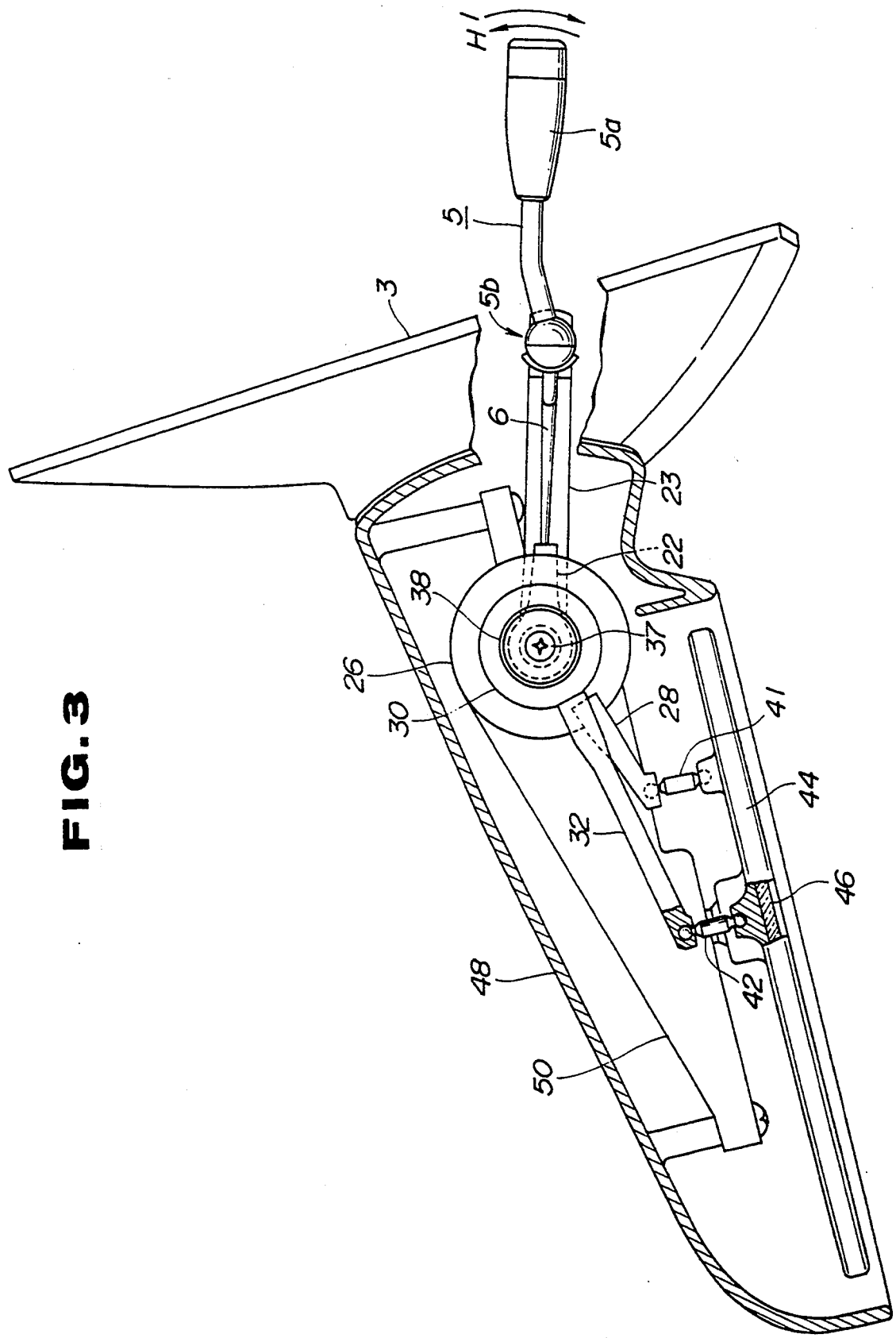
FIG. 3 is a horizontal cross-sectional view of the rearview mirror assembly.
Figure 5:
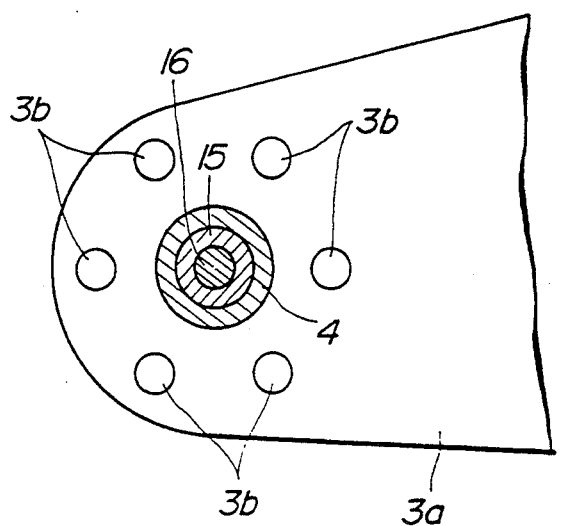
FIG. 5 is a cross-sectional view taken along line V—V of FIG. 2.

As shown in FIGS. 2 and 3, a member 3 fixed to a vehicle body of the automobile 1 has an integral sleeve 4 on an upper surface 3a of its distal end of the member 3 remotely from the passenger's compartment of the automobile 1. The upper surface 3a of the fixed member 3 has six hemispherical recesses 3b (see also FIG. 5) defined therein in surrounding relation to the sleeve 4, the recesses 3b being equally angularly spaced by 60°.

A control lever 5 has a pivot in the form of a separable ball 5b mounted on the fixed member 3 remotely from the sleeve 4. The control lever 5 projects into the passenger's compartment and has a grip 5a on the inner projecting end thereof. The control lever 5 is pivotally supported on the fixed member 3 through the ball 5b, which is joined to two control rods 6, 7 extending outwardly and downwardly, respectively.

Figure 4:
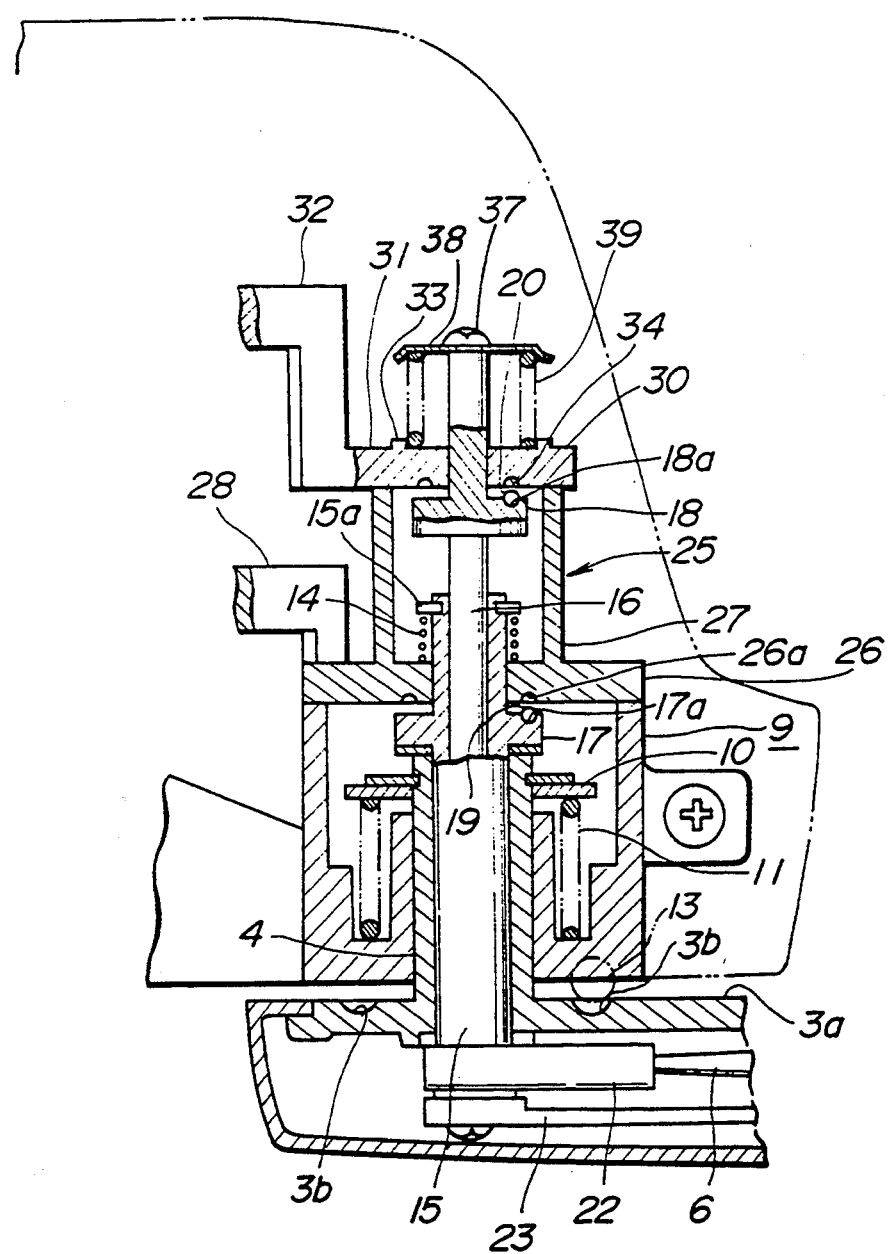
FIG. 4 is a fragmentary vertical cross-sectional view of the rearview mirror assembly, with a mirror swung backwards.
Figure 6:
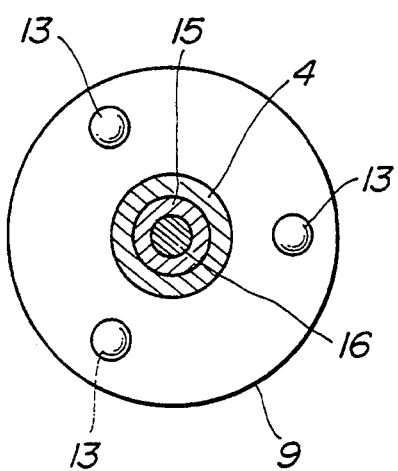
FIG. 6 is a cross-sectional view taken along line VI—VI of FIG. 2.

A cylindrical member 9 is rotatably fitted over the sleeve 4, as shown in FIGS. 2 and 4. The cylindrical member 9 is normally urged to move downwardly toward the upper surface 3a of the fixed member 3 by a spring 11 disposed under compression between the upper surface of the bottom plate of the cylindrical member 9 and a retainer 10 mounted on an upper portion of the sleeve 4. The lower surface of the bottom plate of the cylindrical member 9 has three recesses 12 defined therein at equally spaced intervals of 120°. Balls 13 (see also FIG. 6) are inseparably fitted respectively in the recesses 13 and also in three of the recesses 3b in the upper surface 3a of the fixed member 3. Since the cylindrical member 9 is normally urged downwardly under the bias of the spring 11, the balls 13 are securely retained in the recesses 3b. The recesses 3b, cylindrical member 9, spring 11, recess 12 in the bottom surface of member 9, and balls 13 constitute a releasing mechanism for the mirror housing so that it may rotate about sleeve 4 upon impact.

Figure 8:
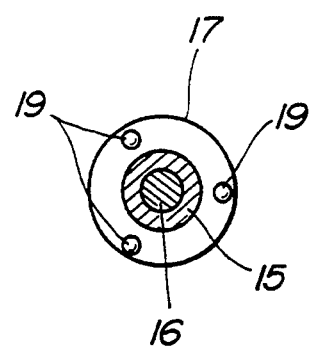
FIG. 8 is a cross-sectional view taken along line VIII—VIII of FIG. 2.

A tubular shaft 15 is rotatably fitted in the sleeve 4, and a smaller-diameter rod-shaped shaft 16 is rotatably fitted in the tubular shaft 15. The tubular shaft 15 and the rod-shaped shaft 16, together with arms (described later on), jointly serve as a rotatable shaft mechanism for adjusting the angle of a mirror 46 (described later on). The tubular shaft 15 has an integral flat plate or flange 17 in the vicinity of the upper end thereof, and the rod-shaped shaft 16 also has an integral flat plate or flange 18 in the vicinity of the upper end thereof. The flange 17 has three equally spaced recesses 17a defined in an upper surface thereof, with balls 19 inseparably fitted in the respective recesses 17a. As shown in FIG. 8, the balls 19 are therefore disposed on the upper surface of the flange 17 at the same angularly spaced intervals as the balls 13. The spring 14 (to be described later on), flange 17, recesses 17a, balls 19 and annular member 26 (to be described later on) The flange 18 also has three equally spaced recesses 18a defined in an upper surface thereof, with balls 20 inseparably fitted in the respective recesses 18a. The balls 20 are also disposed on the upper surface of the flange 19 at the same angularly spaced intervals as the balls 13. The members 17, 17a, 18, 19, 26 and 26a comprise an "engaging means".

A spring 14 is disposed under compression between a retainer 15a mounted on an upper portion of the tubular shaft 15 and an annular member 26 (described later on) disposed on the upper end of the cylindrical member 9. An armlike handle 22 is fixedly fitted over the lower end of the tubular shaft 15, and another arm-like handle 23 is secured to the lower end of the rod-shaped shaft 16 by a screw 24.

The handle 22 has an outer end in which the distal end of the control rod 6 is loosely fitted the handle and control rod constituting a first link means. The handle 23 has a slot 23a defined in an outer end thereof and extending laterally in FIG. 2. The control rod 7 has a lower end engaging in the slot 23a and together with handle 23 constitute a second link means employed to rotate shaft 16.

Figure 7:
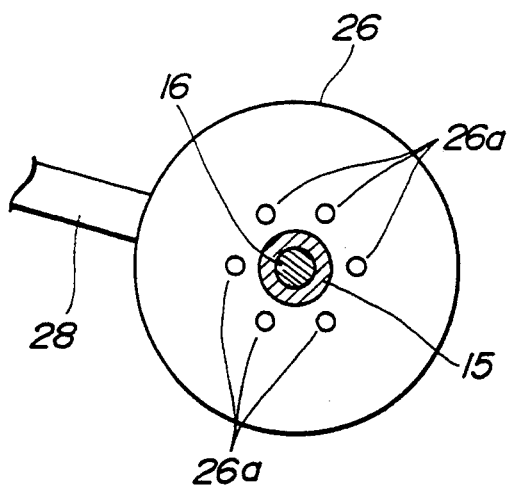
FIG. 7 is a cross-sectional view taken along line VII—VII of FIG. 2.

A support body 25 is rotatably mounted on the tubular shaft 15. The support body 25 comprises the annular member 26 and a tubular member 27 integrally mounted on and extending upwardly from the annular plate 26. A first arm is laterally extending arm 28 is fixed to an upper surface of the annular plate 26. As shown in FIG. 7, the lower surface of the annular plate 26 has six recesses 26a defined therein which are equally angularly spaced by 60°. The balls 19 are fitted in three of these recesses 26a.

Another support body 30 is rotatably mounted on an upper portion of the rod-shaped shaft 16. The support body 30 comprises only an annular plate 31 with a second arm, a laterally extending arm 32, fixed to an upper surface thereof. The support body 30 also has a spring holder 33 on the upper surface of the annular plate 31. The lower surface of the annular plate 31 has six recesses 34 defined therein at equal angular intervals of 60°. The balls 20 are fitted in three of these recesses 34. The spring 39, flange 18, balls 18a, support body 30, annular plate 31, recesses 34 and balls 20 constitute a second releasing mechanism to permit arm 32 to swing with the housing 48.

A retainer 38 is fixedly attached to the upper end of the rod-shaped shaft 16 by a screw 37. Between the retainer 38 and the spring holder 33, there is disposed under compression a spring 39 for normally urging the annular plate 31 downwardly to keep the balls 20 securely retained in the recesses 34 in the annular plate 31.

As shown in FIG. 3, the arms 28, 32 have respective distal ends pivotally coupled at respective positions C, E (FIG. 2) to the rear surface of a mirror holder 44 through respective joints 41, 42. The mirror 46 is retained on the front surface of the mirror holder 44. The rear surface of the mirror holder 44 is pivotally supported at a central position D (FIG. 2) on a support 50. A mirror housing 48 is fixedly fastened to the support 50 by screws in surrounding relation to the rotatable shaft mechanism and the mirror holder 44 with the mirror 46 being exposed through a large opening of the mirror housing 48.

The position C where the arm 28 is pivotally coupled to the mirror holder 44 is spaced laterally from the position D where the mirror holder 44 is pivotally supported on the support 50. The position E where the arm 32 is pivotally coupled to the mirror holder 44 is spaced upwardly from the position D.

The support 50 to which the mirror housing 48 is fastened is either integral with or separate from but fixedly coupled to the cylindrical member 9. Therefore, when the cylindrical member 9 or the support 50 turns, the mirror housing 48 also turns about the axis of the rotatable shaft mechanism which is composed of the tubular shaft 15, the rod-shaped shaft 16 and the arms 28, 32, in unison with the mirror holder 44 within the mirror housing 48.

Figure 9:
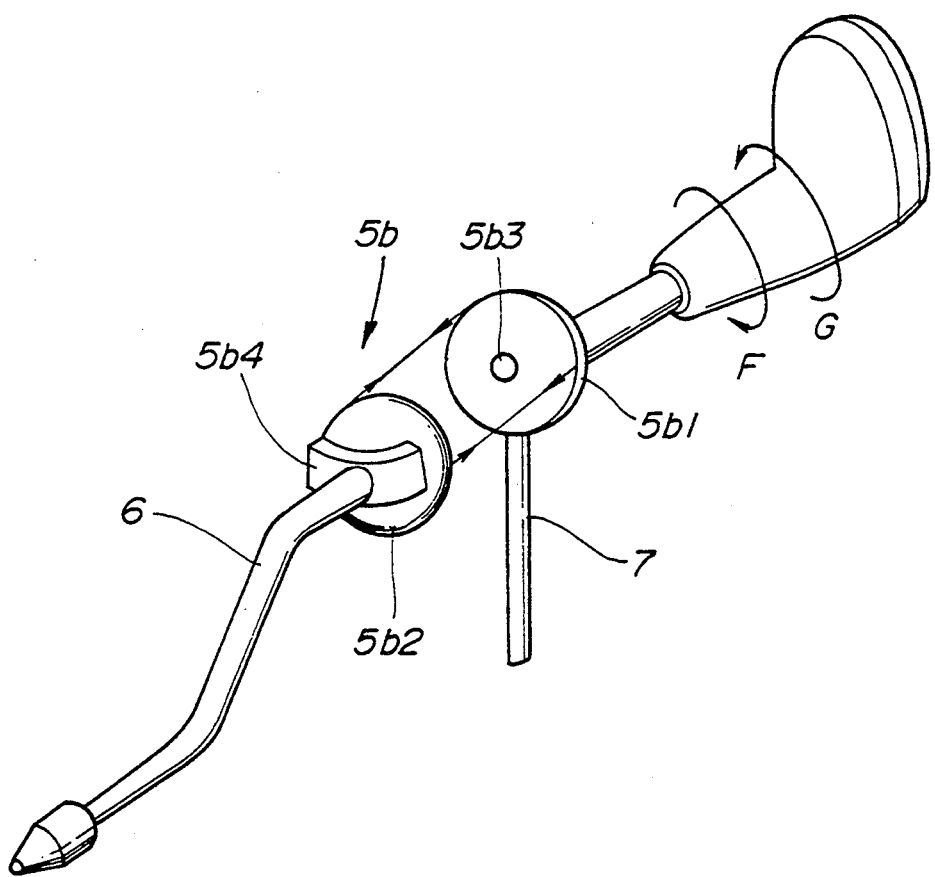
FIG. 9 is an exploded perspective view of a remote control lever of the rearview mirror assembly.
Figure 10:
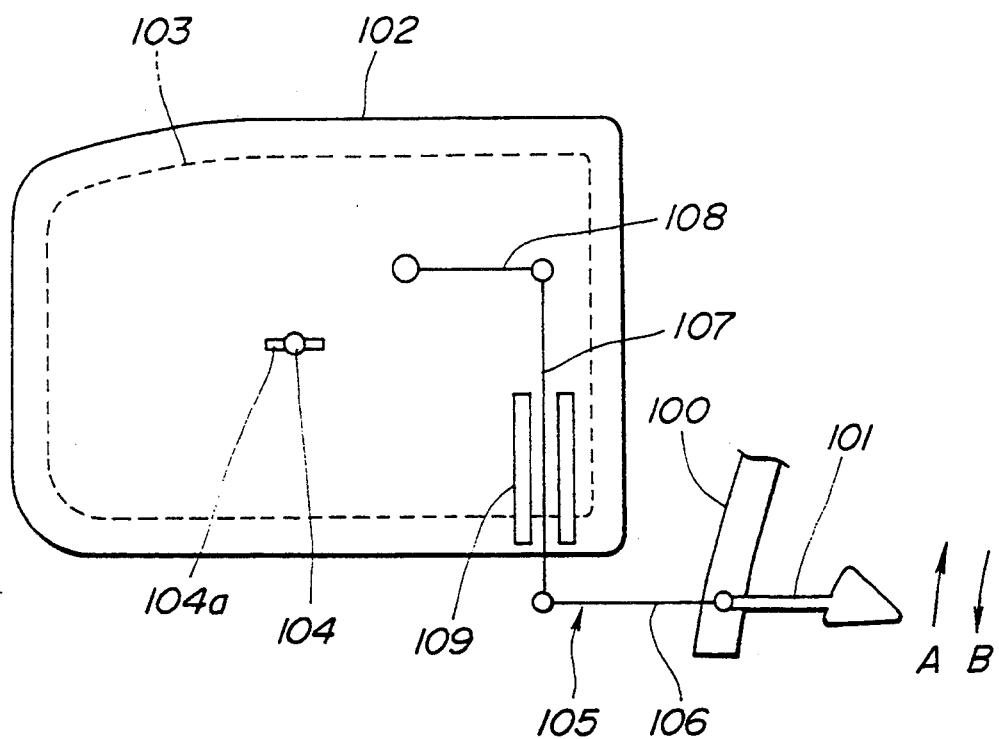
FIG. 10 is a schematic view of a prior art automotive rearview mirror assembly.

The control lever 5 will now be described in detail below with reference to FIG. 9.

The separable ball 5b of the control lever 5 is made up of two front and rear hemispherical members 5b1, 5b2. When the front and rear hemispherical members 5b1, 5b2 are assembled together, a partly spherical projection 5b3 on a flat mating surface of the hemispherical member 5b1 engages in a complementary partly spherical recess (not shown) defined in a flat mating surface of the hemispherical member 5b2. The hemispherical member 5b2 has a guiding ridge 5b4 on its hemispherical surface which is slidably received in a receiving recess 3c (FIG. 2) defined in the fixed member 3 for allowing the hemispherical member 5b2 to swing or turn only in a horizontal plane. With the above construction of the control lever 5, when the grip 5a is turned about the axis of the control lever 5 in the direction indicated by the arrow F or G (FIG. 2), such turning movement of the grip 5a is not transmitted to the hemispherical member 5b2, and hence the control rod 6 does not swing.

A procedure for adjusting the angle of the mirror 46 of the automotive rearview mirror assembly will be described below.

When the control lever 5 is turned about its own axis in the direction indicated by the arrow F or G, only the hemispherical member 5b1 is turned, causing the lower portion of the control rod 7 to swing about the hemispherical member 5b1 in a direction normal to the sheet of FIG. 2. The swinging movement of the control rod 7 causes the arm-like handle 23 to turn about the rod-shaped shaft 16 in a direction normal to the sheet of FIG. 2. When the handle 23 is thus turned, the shaft 16 turns about its own axis. Since the balls 20 engage in the recesses 34 under the bias of the spring 39, the turning movement of the shaft 16 is transmitted to the support body 30, which is therefore angularly moved about the shaft 16. Upon angular movement of the support body 30, the arm 32 swings in a direction normal to the sheet of FIG. 2. Because the arm 32 is coupled to the mirror holder 44 at the position E above the position D, the mirror holder 44 swings vertically about the position D, thereby vertically adjusting the angle of the mirror 46. The annular plate 31 with the recesses 34 defined in its lower surface, and the spring 39 jointly serve as an engaging means for conjointly engaging the balls 20 and the flange 18.

When the control lever 5 is swung horizontally in the direction indicated by the arrow H or I in FIG. 3, the two hemispherical members 5b1, 5b2 turn together, causing the control rod 6 extending from the hemispherical member 5b2 to swing in a horizontal plane (normal to the sheet of FIG. 2) about the ball 5b. The arm-like handle 22 is therefore caused to swing in a direction normal to the sheet of FIG. 2 about the tubular shaft 15. The swinging movement of the handle 22 turns the shaft 15 about its own axis. Inasmuch as the balls 19 engage in the recesses 26a under the bias of the spring 14, the turning movement of the shaft 15 is transmitted to the support body 25, which is therefore turned about the shaft 15. Upon turning movement of the support body 25, the arm 28 swings in a direction normal to the sheet of FIG. 2. Because the arm 28 is coupled to the mirror holder 44 at the position C laterally of the position D, the mirror holder 44 swings laterally about the position D, thereby laterally adjusting the angle of the mirror 46. The annular plate 26 with the recesses 26a defined therein, and the spring 14 jointly serve as an engaging means for conjointly engaging the balls 19 and the flange 17.

In this embodiment, both the turning movement of the control lever 5 about its own axis (in the direction indicated by the arrow F or G) and the swinging movement of the control lever 5 in the horizontal plane (in the direction indicated by the arrow H or I) are converted into turning movement of the shafts 15, 16. Consequently, the shafts 15, 16 are not required to move vertically for mirror angle adjustment, unlike the conventional rearview mirror assembly. Since the rearview mirror assembly according to the present invention does not require an extra vertical space which would otherwise be needed to allow the shafts 15, 16 to move vertically therein, the rearview mirror assembly has a reduced height and hence is rendered compact in size. The shafts 15, 16 are not vertically moved while being forced into localized abutment against the fixed sleeve 4, but are simply turned about their own axes. Accordingly, any resistance to the turning movement of the shafts 15, 16 is small, and hence forces required to move the control lever 5 are small. The shafts 15, 16 are also prevented from being subject to localized wear. As the shafts 15, 16 are not vertically moved in the sleeve 4, any foreign matter such as dust particles is prevented from entering between the shafts 15, 16 and the sleeve 4.

The shafts 15, 16 and the sleeve 4 are protected because they are covered with the cylindrical member 9 and the support 25.

When the mirror housing 48 is forcibly swung backwards from the operative position indicated by the solid lines in FIG. 1, the cylindrical member 9 and the support 50 are also turned with the mirror housing 48 about the shaft 16. At this time, the balls 13 are moved out of the recesses 3b onto the upper surface 3a of the distal end portion of the fixed member 3, as shown in FIG. 4. Now, the cylindrical member 9 is slightly moved upwardly or lifted away from the upper surface 3a of the fixed member 3. The support bodies 25, 30 are also moved upwardly, thereby bringing the balls 19, 20 out of the recesses 26a, 34. Therefore, the cylindrical member 9 serves as a releasing means for releasing the above two engaging means. Consequently, the forces to turn the support bodies 25, 30 upon the backward swinging movement of the mirror housing 48 are not transmitted to the shafts 16, 17, so that no undue stresses will be applied to the handles 22, 23.

In the position shown in FIG. 4, the springs 14, 39 are further compressed by the upward movement of the support bodies 25, 30, imposing certain forces axially to the cylindrical member 9 and the support bodies 25, 30 thereby to prevent them from sliding with respect to each other but allow them to be secured together for angular movement in unison.

When the mirror housing 48 is swung back to the rearmost position indicated by the imaginary-line position in FIG. 1 (through 60° from the operative position), the balls 13 engage in next recesses 3b which are 60° spaced from the recesses 3b in which the balls 13 previously engaged. When the balls 13 engage in the next recesses 3b, the cylindrical member 9 is moved downwardly or lowered and secured in position. When the mirror housing 48 is swung, the cylindrical member 9 and the support bodies 25, 30 are angularly moved in unison with each other as described above. Since the recesses 26a, 34 are defined at equal angular intervals of 60° as with the recesses 3b, when the balls 13 engage in the next recesses 3b as described above, the balls 19 also engage in next recesses 26a, and the balls 20 also engage in next recesses 34.

If the balls 19 stayed out of the recesses 26a and the balls 20 out of the recesses 34 as shown in FIG. 4 when the mirror housing 48 is in the rearmost position, the angle formed between the balls 19 and the recesses 26a and the angle formed between the balls 20 and the recesses 34 at the axis of the shaft 16 would differ depending on whether the control lever 5 is swung in the direction indicated by the arrow H or I or the control lever 5 is turned in the direction indicated by the arrow F or G. Therefore, when the balls 13 engage in the recesses 3b after the mirror housing 48 has returned to the operative position, the balls 19, 20 would not engage in the recesses 26a, 34, respectively, and the support bodies 25, 30 would not be lowered. As a result, the angle of the mirror 46 could not be adjusted even when the control lever 5 is operated on.

In the rearview mirror assembly according to the present invention, however, when the mirror housing 48 is turned to the rearmost position, the cylindrical member 9 and the support bodies 25, 30 turn in unison with each other without sliding relatively to each other. Therefore, at the time the cylindrical member 9 descends to cause the balls 13 to engage in the recesses 3b, the support bodies 25, 30 are also lowered to cause the balls 19, 20 to engage in the recesses 26a, 34, respectively. As a consequence, even if the control lever 5 is operated on when the mirror housing 48 is in the rearmost position, the balls 19, 20 will not be displaced out of the recesses 26a, 34. The angle of the mirror 46 can thus be reliably adjusted in angle when the mirror housing 48 is in the operative position.

with the present invention, control movement of the control lever 5 is converted into angular movement of the rotatable shaft mechanism which includes the tubular shaft 15 and the rod-shaped shaft 16. Since these shafts 15, 16 are not vertically moved, the rearview mirror assembly is rendered relatively compact and forces required to move the control lever 5 are reduced.

Although there has been described what is at present considered to be the preferred embodiment of the present invention, it will be understood that the invention may be embodied in other specific forms without departing from the essential characteristics thereof. The present embodiment is therefore to be considered in all aspects as illustrative, and not restrictive. The scope of the invention is indicated by the appended claims rather than by the foregoing description.

We claim:

1. An automotive rearview mirror assembly for use on an automobile having a passenger's compartment, comprising:
    a mirror housing adapted to be mounted on a fixed member of the automobile outside of the passenger's compartment;
    a mirror swingably disposed in said mirror housing;
    a control mechanism including a control lever adapted to project from said housing into the passenger's compartment;
    a rotatable shaft mechanism including first and second arms and pivotally coupled through the two arms to a rear surface of said mirror at first and second positions thereon, said rotatable shaft mechanism further including therein coaxially disposed first and second shafts which are independently rotatable, respectively, in response to control movements of said control lever and are capable of through the two arms vertically and laterally adjusting the angle of said mirror with respect to said mirror housing, respectively;
    said first and second shafts constrained to remain coaxial for all positions of the mirror, and
    said rotatable shaft mechanism being disposed within said mirror housing and rotatable about an axis extending vertically to a fixed member, and said mirror housing being angularly movable in unison with said mirror about the vertical axis, independently of the rotation of said rotatable shaft mechanism.

2. An automotive rearview mirror assembly according to claim 1, wherein said first shaft includes a tubular shaft rotatably disposed vertically in said housing;
    said second shaft includes a rod-shaped shaft rotatably disposed coaxially in said tubular shaft;
    said first arm has an end pivotally coupled to the rear surface of said mirror at said first position thereon, said first arm being conjointly engageably coupled to said tubular shaft; and
    said second arm has an end pivotally coupled to the rear surface of said mirror at said second position thereon, said second arm being conjointly engageably coupled to said rod-shaped shaft.

3. An automotive rearview mirror assembly according to claim 2, wherein said control mechanism comprises:
    a pivot member adapted to be angularly movably mounted in the fixed member of the automobile, said control lever being coupled to said pivot member;
    first link means for converting horizontal swinging movement of said control lever into turning movement about an axis of said tubular shaft, said first link means connecting said pivot member to said tubular shaft; and
    second link means for converting turning movement of said control lever about its own axis into turning movement about an axis of said rod-shaped shaft, said second link means connecting said pivot member to said rod-shaped shaft.

4. An automotive rearview mirror assembly according to claim 3, wherein said pivot member comprises a ball composed of a front hemispherical member from which said control lever extends horizontally, and a rear hemispherical member engaging said front hemispherical member and movable therewith only in response to horizontal swinging movement of said control lever, said first link means comprising a first control rod extending substantially horizontally from said rear hemispherical member and a first handle extending from a lower end of said tubular shaft and engaging a distal end of said first control rod, said second link means comprising a second control rod extending vertically downwardly from said front hemispherical member and a second handle extending from a lower end of said rod-shaped shaft and engaging a distal end of said second control rod.

5. An automotive rearview mirror assembly according to claim 3, further comprising a fixed sleeve adapted to be coaxially with the vertical axis and fixedly mounted vertically on the fixed member and disposed in said mirror housing, and a releasing mechanism disposed in surrounding relation to said fixed sleeve, said tubular shaft having an annular flange conjointly engageable with said first arm and being rotatably supported in said fixed sleeve with said annular flange exposed upwardly, said first arm having on a proximal end thereof first engaging means conjointly engageable with said annular flange of the tubular shaft, said releasing mechanism being angular movably around said fixed sleeve for releasing said annular flange out of conjoint engagement with said first engaging means to allow said first arm to swing in unison with said releasing mechanism.

6. An automotive rearview mirror assembly according to claim 5, wherein said mirror housing is integrally coupled to said releasing mechanism for angular movement about said fixed sleeve.

7. An automotive rearview mirror assembly according to claim 6, wherein said rod-shaped shaft has an annular flange conjointly engageable with said second arm and being rotatably supported in said tubular shaft with said annular flange exposed upwardly, said second arm having on a proximal end thereof second engaging means conjointly engageable with said annular flange of the rod-shaped shaft, said releasing mechanism being angular movably around said fixed sleeve for releasing said annular flange of the rod-shaped shaft out of conjoint engagement with said second engaging means to allow said first arm to swing in unison with said releasing mechanism.

8. An automotive rearview mirror assembly for use on an automobile having a passenger's compartment, comprising:
a mirror housing adapted to be mounted on a fixed member of the automobile outside of the passenger's compartment;
a mirror swingably disposed for angular rotation about generally perpendicular axes in said mirror housing;
a control mechanism including a control level adapted to project from said housing into the passenger's compartment;
a rotatable shaft mechanism including first and second arms and pivotally coupled through the two arms to a rear surface of said mirror at first and second positions thereon, said rotatable shaft mechanism further including therein coaxially disposed first and second shafts which are independently rotatable, respectively, in response to control movements of said control lever and are capable of through the two arms vertically and laterally adjusting the angle of said mirror with respect to said mirror housing, respectively;
said first and second shafts constrained to remain coaxial for all positions of the control lever required to adjust the position of the mirror about its axes, and
said rotatable shaft mechanism being disposed within said mirror housing and rotatable about an axis extending vertically to a fixed member, and said mirror housing being angularly movable in unison with said mirror about the vertical axis, independently of the rotation of said rotatable shaft mechanism.

9. An automotive rearview mirror assembly for use on an automotive having a passenger's compartment, comprising:
a mirror housing adapted to be mounted on a fixed member of the automobile outside of the passenger's compartment;
a mirror swingably disposed in said mirror housing;
a control mechanism including a control lever adapted to project from said mirror housing into the passenger's compartment;
a rotatable shaft mechanism disposed in said mirror housing and operatively pivotably coupled to a rear surface of said mirror at a plurality of positions thereon, said rotatable shaft mechanism including coaxially disposed first and second shafts which are rotatable independently of each other about a single axis common to said first and second shafts in response to control movements of said control lever and are capable of vertically and laterally adjusting the angle of said mirror with respect to said mirror housing; and
said mirror housing being angularly swingable about said single axis in unison with said mirror, independently of the rotations of said first and second shafts.

10. An automotive rearview mirror assembly according to claim 9, wherein said rotatable shaft mechanism further comprises a first arm having an end pivotally coupled to the rear surface of said mirror at a first position thereon, said first arm being conjointly engageably coupled to said first shaft, and a second arm having an end pivotally coupled to the rear surface of said mirror at a second position thereon, said second arm being conjointly engageably coupled to said second shaft;
said mirror is pivotally supported at a central position thereof on the rear surface of said mirror housing; and
said first position is spaced laterally from the central position and said second position is spaced upwardly from the central position.

11. An automotive rearview mirror assembly according to claim 10, wherein said first shaft includes a tubular shaft, and said second shaft includes a rod-shaped shaft coaxially rotatably fitted in said tubular shaft.

12. An automotive rearview mirror assembly according to claim 11, further comprising a fixed sleeve adapted to be fixedly mounted on the fixed member and disposed in said mirror housing, whereby said tubular shaft coaxially rotatably fitted in said fixed sleeve.

13. An automotive rearview mirror assembly according to claim 12, further comprising a releasing means integrally coupled to said mirror housing and rotatably fitted over said sleeve for releasing said tubular shaft and said rod-shaped shaft out of conjoint engagement with said first and second arms, respectively, to allow said first and second arms to swing in unison with said mirror housing.

* * * * *